(12) United States Patent
Reinert et al.

(10) Patent No.: US 12,462,486 B2
(45) Date of Patent: Nov. 4, 2025

(54) ADAPTIVE MESH REPROJECTION FOR LOW LATENCY 6DOF RENDERING

(71) Applicant: Google LLC

(72) Inventors: Bernhard Reinert, Mountain View, CA (US); Sebastian Sylvan, Mountain View, CA (US); Hugues Hoppe, Mountain View, CA (US); Grigory Javadyan, Mountain View, CA (US); Egor Yusov, Mountain View, CA (US); David Chu, Mountain View, CA (US); Kelvin Ritland, Mountain View, CA (US)

(73) Assignee: Google LLC, Mountain View, CA (US)

( * ) Notice: Subject to any disclaimer, the term of this patent is extended or adjusted under 35 U.S.C. 154(b) by 145 days.

(21) Appl. No.: 18/050,058

(22) Filed: Oct. 27, 2022

(65) Prior Publication Data

US 2023/0134779 A1 May 4, 2023

Related U.S. Application Data

(60) Provisional application No. 63/263,227, filed on Oct. 28, 2021.

(51) Int. Cl.
*G06T 15/20* (2011.01)
*G06T 7/50* (2017.01)
(Continued)

(52) U.S. Cl.
CPC .............. *G06T 17/20* (2013.01); *G06T 7/50* (2017.01); *G06V 10/761* (2022.01); *G06T 2207/10024* (2013.01); *G06T 2207/20164* (2013.01)

(58) Field of Classification Search
CPC .................. H04N 19/573; G06T 2207/10028
See application file for complete search history.

(56) References Cited

U.S. PATENT DOCUMENTS 10,762,691 B2 * 9/2020 Yeung ................. G02B 27/017
11,032,534 B1 * 6/2021 Voss-Wolff ............ G06T 17/20
(Continued)

OTHER PUBLICATIONS

Newcombe et al., Live Dense Reconstruction with a Single Moving Camera, 2010 (Year: 2010).*
(Continued)

*Primary Examiner* — Phong X Nguyen
(74) *Attorney, Agent, or Firm* — Shumaker & Sieffert, P.A.

(57) ABSTRACT

A method includes obtaining a first frame of image data including a plurality of pixels. Each pixel of the plurality of pixels is associated with a respective color value and a respective depth value. The first frame renders a scene from a first point of view. The method includes generating a three-dimensional (3D) polygon mesh using the plurality of pixels and the respective depth values. The 3D polygon mesh includes a plurality of portions. Each respective portion defines a respective plurality of vertices defining a respective mesh density representative of a density of the respective plurality of vertices. Each vertex is associated with a corresponding pixel of the first frame of image data. The method includes generating a second frame of image data via reprojection using the generated 3D polygon mesh. The second frame of image data has a second point of view different from the first point of view.

16 Claims, 8 Drawing Sheets

(51) Int. Cl.
*G06T 17/20* (2006.01)
*G06V 10/74* (2022.01)

(56) References Cited

U.S. PATENT DOCUMENTS

| | | | | |
|---|---|---|---|---|
| 11,988,835 | B2* | 5/2024 | Price | G02B 27/0172 |
| 2007/0086645 | A1* | 4/2007 | Kim | G06T 7/593 |
| | | | | 382/284 |
| 2009/0109219 | A1* | 4/2009 | DeCoro | G06T 17/205 |
| | | | | 345/423 |
| 2010/0026712 | A1* | 2/2010 | Aliprandi | G06T 15/20 |
| | | | | 345/629 |
| 2010/0091092 | A1* | 4/2010 | Jeong | H04N 19/597 |
| | | | | 348/E13.001 |
| 2013/0057644 | A1* | 3/2013 | Stefanoski | H04N 13/111 |
| | | | | 348/42 |
| 2013/0201184 | A1* | 8/2013 | Guo | H04N 13/261 |
| | | | | 345/419 |
| 2015/0036926 | A1* | 2/2015 | Choi | G06T 5/50 |
| | | | | 382/167 |
| 2015/0348319 | A1* | 12/2015 | Supikov | G06T 15/205 |
| | | | | 345/419 |
| 2017/0018121 | A1* | 1/2017 | Lawson | G06V 40/10 |
| 2018/0199039 | A1* | 7/2018 | Trepte | G06T 7/70 |
| 2019/0220987 | A1* | 7/2019 | Huang | G06T 7/11 |
| 2019/0289284 | A1* | 9/2019 | Smith | A61B 1/000095 |
| 2019/0340812 | A1* | 11/2019 | Fuetterling | G06T 9/00 |
| 2020/0410638 | A1* | 12/2020 | Yun | G06T 7/90 |
| 2021/0358216 | A1* | 11/2021 | LaFayette | G06F 3/013 |
| 2022/0066543 | A1* | 3/2022 | Rhyu | H04W 4/30 |
| 2022/0343601 | A1* | 10/2022 | Liaudanskas | G06V 10/774 |
| 2023/0134779 | A1* | 5/2023 | Reinert | G06T 15/20 |
| | | | | 345/420 |
| 2023/0316583 | A1* | 10/2023 | Yip | G06T 9/001 |
| | | | | 345/156 |
| 2024/0089428 | A1* | 3/2024 | Li | H04N 19/172 |

OTHER PUBLICATIONS

Pokale et al., Reconstruct, Rasterize and Backprop: Dense shape and pose estimation from a single image, 2020 (Year: 2020).*
Bonatto et al., Real-Time Depth Video-Based Rendering for 6-DoF HMD Navigation and Light Field Displays, 2021 (Year: 2021).*
International Search Report and Written Opinion for the related Application No. PCT/US2022/078758, dated May 9, 2023, 21 pages.
Joon Hong Park et al: "A Mesh-Based Disparity Representation Method for View Interpolation and Stereo Image Compression", IEEE Transactions on Image Processing, vol. 15, No. 7, Jul. 1, 2006 (Jul. 1, 2006), pp. 1751-1762, XP093027206, USA ISSN: 1057-7149, DOI: 10.1109/TIP.2006.877070 Retrieved from the Internet: chrome-extension://efaidnbmnnnibpcajpcglclefindmkaj/https://koasas.kaist.ac.kr/bitstream/10203/3410/1/000238714200005.pdf, the whole document, 12 pages.
International Preliminary Report on Patentability from International Application No. PCT/US2022/078758 dated Apr. 30, 2024, 12 pp.
Response to Communication Pursuant to Rules 161(1) and 162 EPC dated Jun. 5, 2024, from counterpart European Application No. 22813841.8, filed Dec. 3, 2024, 17 pp.

* cited by examiner

ADAPTIVE MESH REPROJECTION FOR LOW LATENCY 6DOF RENDERING

CROSS REFERENCE TO RELATED APPLICATIONS

This U.S. patent application claims priority under 35 U.S.C. § 119(e) to U.S. Provisional Application 63/263,227, filed on Oct. 28, 2021. The disclosure of this prior application is considered part of the disclosure of this application and is hereby incorporated by reference in its entirety.

TECHNICAL FIELD

This disclosure relates to adaptive mesh reprojection for low latency six degrees of freedom (6DOF) rendering.

BACKGROUND

For some image processing applications, such as virtual reality applications, it is critical that a rendered view that a user views corresponds to the user's head pose when they see the frame. Thus, the latency between when the content was rendered and when the user sees it must be minimized for a quality experience. Some services, such as cloud rendering, increase this challenge as the frame is rendered remotely and streamed to the viewer client, which can add tens of milliseconds of extra latency.

SUMMARY

One aspect of the disclosure provides a computer-implemented method for adaptive mesh reprojection. The method, when executed by data processing hardware, causes the data processing hardware to perform operations. The operations include obtaining a first frame of image data comprising a plurality of pixels. Each pixel of the plurality of pixels is associated with a respective color value and a respective depth value. The first frame of image data renders a scene from a first point of view. The operations include generating a three-dimensional (3D) polygon mesh using the plurality of pixels and the respective depth values. The 3D polygon mesh comprises a plurality of portions. Each respective portion of the plurality of portions defines a respective plurality of vertices defining a respective mesh density representative of a density of the respective plurality of vertices at the respective portion of the 3D polygon mesh. Each vertex of the respective plurality of vertices is associated with a corresponding pixel of the plurality of pixels of the first frame of image data. The operations include generating a second frame of image data via reprojection using the generated 3D polygon mesh. The second frame of image data has a second point of view different from the first point of view.

Implementations of the disclosure may include one or more of the following optional features. In some implementations, generating the 3D polygon mesh includes, for each respective portion of the plurality of portions, offsetting each vertex of the respective plurality of vertices based on the respective depth value of the corresponding pixel associated with the vertex. In some examples, each respective mesh density is based on content of the scene and a view error representative of differences between the first point of view and the second point of view. In some of these examples, each respective mesh density is based on a planarity and a depth of a surface rendered within the respective portion. In some of these examples, the respective mesh density when the surface rendered within the respective portion is planar is greater than the respective mesh density when the surface rendered within the respective portion is nonplanar. In other of these examples, the respective mesh density is greater the greater the depth of the surface rendered within the respective portion.

In some implementations, the operations further include determining that the second frame of image data includes a portion of the scene that was not visible in the first frame of image data and replacing, for each of one or more pixels in the second frame of image data, the respective depth value associated with the pixel with a different depth value that is smaller than the respective depth value. In some of these implementations, the different depth value corresponds to the respective depth value of a different pixel within a threshold distance of the one or more pixels in the second frame of image data.

Optionally, the operations further include determining that the second frame of image data includes a portion of the scene that was not visible in the first frame of image data, determining whether the portion of the scene that was not visible in the first frame of image data is visible in a historical frame of image data, and, when the portion of the scene is visible in the historical frame of image data, adjusting the second frame of image data with information from the historical frame of image data. The first point of view may include a predicted point of view of a user and the second point of view may include an actual point of view of the user.

Another aspect of the disclosure provides a system for adaptive mesh reprojection. The system includes data processing hardware and memory hardware in communication with the data processing hardware. The memory hardware stores instructions that when executed on the data processing hardware cause the data processing hardware to perform operations. The operations include obtaining a first frame of image data comprising a plurality of pixels. Each pixel of the plurality of pixels is associated with a respective color value and a respective depth value. The first frame of image data renders a scene from a first point of view. The operations include generating a three-dimensional (3D) polygon mesh using the plurality of pixels and the respective depth values. The 3D polygon mesh comprises a plurality of portions. Each respective portion of the plurality of portions defines a respective plurality of vertices defining a respective mesh density representative of a density of the respective plurality of vertices at the respective portion of the 3D polygon mesh. Each vertex of the respective plurality of vertices is associated with a corresponding pixel of the plurality of pixels of the first frame of image data. The operations include generating a second frame of image data via reprojection using the generated 3D polygon mesh. The second frame of image data has a second point of view different from the first point of view.

This aspect may include one or more of the following optional features. In some implementations, generating the 3D polygon mesh includes, for each respective portion of the plurality of portions, offsetting each vertex of the respective plurality of vertices based on the respective depth value of the corresponding pixel associated with the vertex. In some examples, each respective mesh density is based on content of the scene and a view error representative of differences between the first point of view and the second point of view. In some of these examples, each respective mesh density is based on a planarity and a depth of a surface rendered within the respective portion. In some of these examples, the respective mesh density when the surface rendered within the respective portion is planar is greater than the respective mesh density when the surface rendered within the respective portion is nonplanar. In other of these examples, the respective mesh density is greater the greater the depth of the surface rendered within the respective portion.

In some implementations, the operations further include determining that the second frame of image data includes a portion of the scene that was not visible in the first frame of image data and replacing, for each of one or more pixels in the second frame of image data, the respective depth value associated with the pixel with a different depth value that is smaller than the respective depth value. In some of these implementations, the different depth value corresponds to the respective depth value of a different pixel within a threshold distance of the one or more pixels in the second frame of image data.

Optionally, the operations further include determining that the second frame of image data includes a portion of the scene that was not visible in the first frame of image data, determining whether the portion of the scene that was not visible in the first frame of image data is visible in a historical frame of image data, and, when the portion of the scene is visible in the historical frame of image data, adjusting the second frame of image data with information from the historical frame of image data. The first point of view may include a predicted point of view of a user and the second point of view may include an actual point of view of the user.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

For some image processing application, such as virtual reality applications, it is critical that a rendered view that a user views corresponds to the user's head pose when the user views the frame. Thus, the latency between when the scene was rendered and when the user views the scene must be minimized for a quality experience. Some services, such as cloud rendering, increase this challenge because the frame is rendered remotely and streamed to the viewer client, which can add tens of milliseconds or more of extra latency.

In order to reduce this latency, the cloud rendering service may predict a future pose or point of view of the user, render the frame using the predicted pose or point of view, and transmit the rendered frame to the user. When the prediction is correct, the rendered frame will be immediately available (as it is rendered and transmitted early) and the virtual reality application can display the rendered image to the user without the latency caused by the distance/delay between the user and the cloud rendering service. However, in some scenarios, the predicted pose or point of view of the user is incorrect, and there is a difference between the predicted pose and the actual pose of the user. In this case, the frame of image data should not be used, as it does not reflect the actual pose of the user and display of the incorrect pose may cause the user discomfort. However, receiving a new frame from the cloud rendering service that reflects the actual pose of the user would incur the latency previously discussed, which is also suboptimal.

Implementations herein are directed toward a six degree-of-freedom (6DOF) reprojector that receives a rendered frame, and, using client-side reprojection, reprojects the rendered frame with a different pose or point of view. The reprojector receives a first frame of image data and generates an adaptive three-dimensional (3D) polygon mesh. The reprojector, using this polygon mesh, generates or renders a second frame of image data that represents a point of view that is different than the point of view of the first frame of image data.

Figure 1:
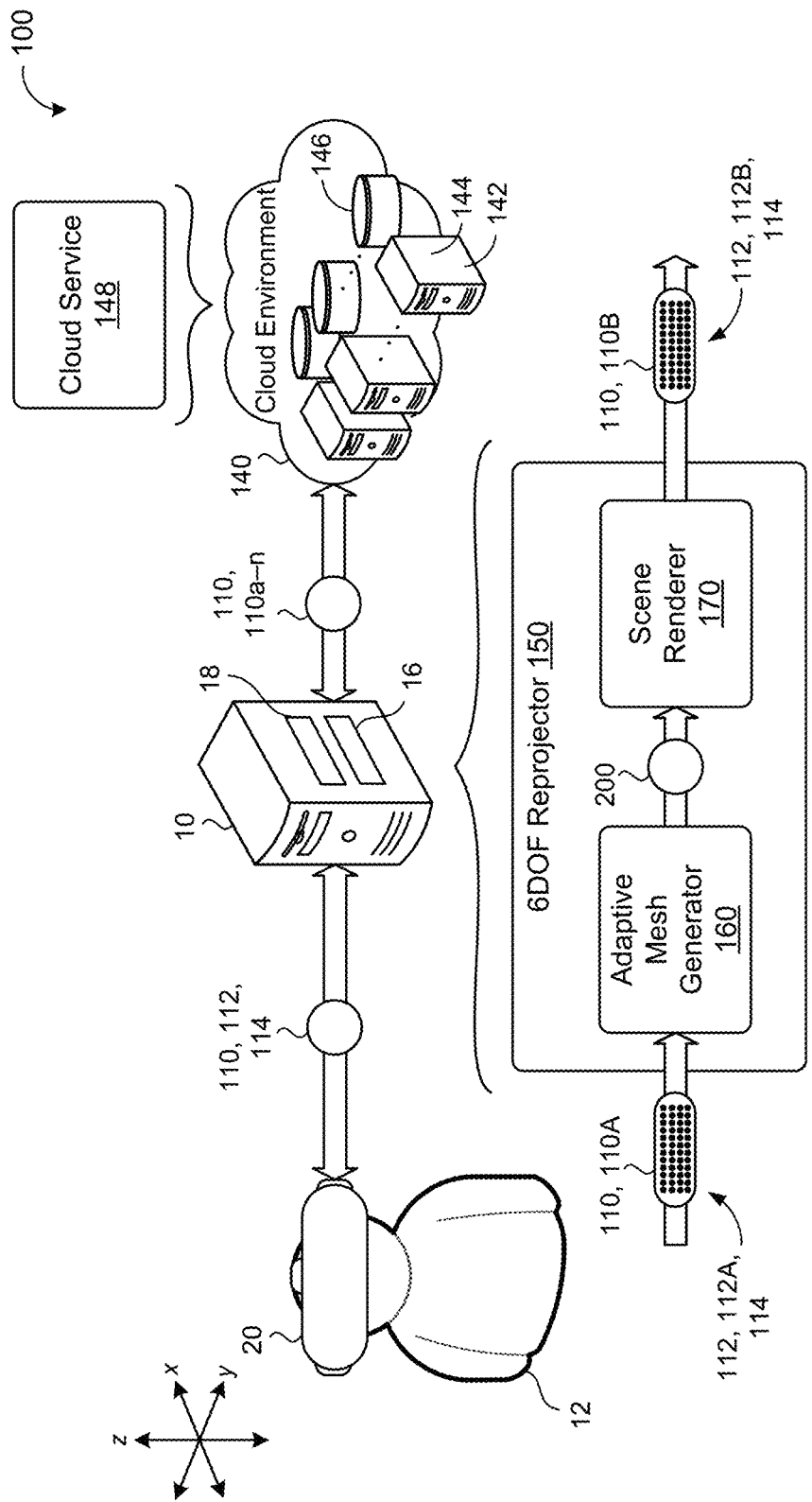
FIG. 1 is a schematic view of an example system for using adaptive mesh reprojection for low latency 6DOF rendering.

Referring to FIG. 1, in some implementations, an example reprojection system 100 includes a remote system 140 in communication with one or more user devices 10. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware).

In some examples, the remote system 140 executes a cloud service 148, such as a cloud streaming service or a cloud rendering service. For example, the cloud service 148 renders frames of image data 110, 110*a-n* and transmits the rendered frames of image data 110 to a user device 10. Each frame of image data 110 includes multiple pixels 112. Each pixel includes a corresponding color value and a corresponding depth value 114 that represents a virtual distance between a plane corresponding to the point of view of the image and a rendered object the pixel 112 represents. That is, the depth value 114 represents how "deep" into the image an object partially rendered by the pixel 112 is from the point of view of a viewer of the frame of image data 110. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The user device 10 may provide the rendered frames of image data 110 to a display device 20 (e.g., a virtual reality (VR) headset) viewed by a user 12.

The rendered frames of image data 110 provided to the display 20 may be sensitive to latency. That is, the typical latency for data transferred between the remote system 140 and the display 20 (e.g., tens of milliseconds) may be detrimental to the user experience of the user 12. To minimize the effects of the latency, in some implementations, the remote system 140 renders a frame of image data 110 and transmits the frame of image data 110 "early" to the user device 10/display 20. That is, the cloud service 148 may render and transmit the frame of image data 110 an amount of time equal to or greater than the latency between the devices 140, 10 before the display 20 is to display the rendered frame of image data 110. For example, when the latency between the cloud service 148 and the display 20 is 20 ms, the cloud service 148 may transmit the rendered frame of image data 110 to the user device 10 at least 20 ms before the rendered frame of image data 110 is scheduled to be displayed on the display 20. Thus, when the time arrives to display the rendered frame of image data 110, the frame of image data 110 is immediately available to the user device 10 and the display 20 and can be displayed without the latency associated with the cloud service 148.

In some implementations, the frame of image data 110 to be rendered is dependent upon user input. For example, when the display is a VR display, the frame of image data 110 to be rendered may be dependent upon a pose (i.e., a point of view in 3D space) of the user 12. That is, the user 12 may provide user input (e.g., physical movement of the display 20, input via a controller, mouse, keyboard, etc.) that indicates a desired point of view within the scene being rendered by the cloud service 148. In some examples, the pose may be adjusted in any direction of 3D space along an x, y, and/or z axis (i.e., with 6DOF). The cloud service 148 may attempt to account for user input by predicting or estimating a future pose required for a rendered frame of image data 110. That is, when the latency between the cloud service 148 and the display 20 is 30 ms, the cloud service 148 may predict the desired pose or point of view of the user or display 30 ms in the future.

In some scenarios, when the user device 10 receives a rendered frame of image data 110, 110A based on a predicted pose from the cloud service 148, the user device 10 determines that the predicted pose is inaccurate. That is, in some examples, there is a difference or error between the pose predicted by the cloud service 148 (and subsequently used to render the frame of image data 110A) and the actual required pose based on received user input (i.e., user input that has been received after the cloud service 148 rendered the frame of image data 110A). In this situation, there is insufficient time to request and receive an updated frame of image data 110 from the cloud service 148 without incurring significant latency or "lag." That is, there is insufficient time to render and transmit a frame of image data 110 before the frame of image data 110 is scheduled to be displayed. To mitigate this, the user device 10 may execute a 6DOF reprojector 150. The reprojector 150, using the frame of image data 110A rendered by the cloud service 148 (that has, to some degree, an incorrect pose or point of view), renders a second frame of image data 110, 110B with the correct pose using reprojection. That is, a first point of view of the source frame of image data 110A is different than a second point of view of the second frame of image data 110B, as the point of view of the second frame of image data 110B reflects an actual point of view or desired point of view of the user 12. The difference between the first point of view and the second point of view represents the error of the point of view predicted by the cloud service 148 and represented within the first frame of image data 110A.

The 6DOF reprojector 150 includes an adaptive mesh generator 160. In some examples, the adaptive mesh generator 160 receives the source frame of image data 110A (i.e., rendered by the cloud service 148), which includes a first set of pixels 112, 112A and respective depth values 114. Using the pixels 112A and the respective depth values 114, the adaptive mesh generator 160 generates a 3D polygon mesh 200.

Figure 2:
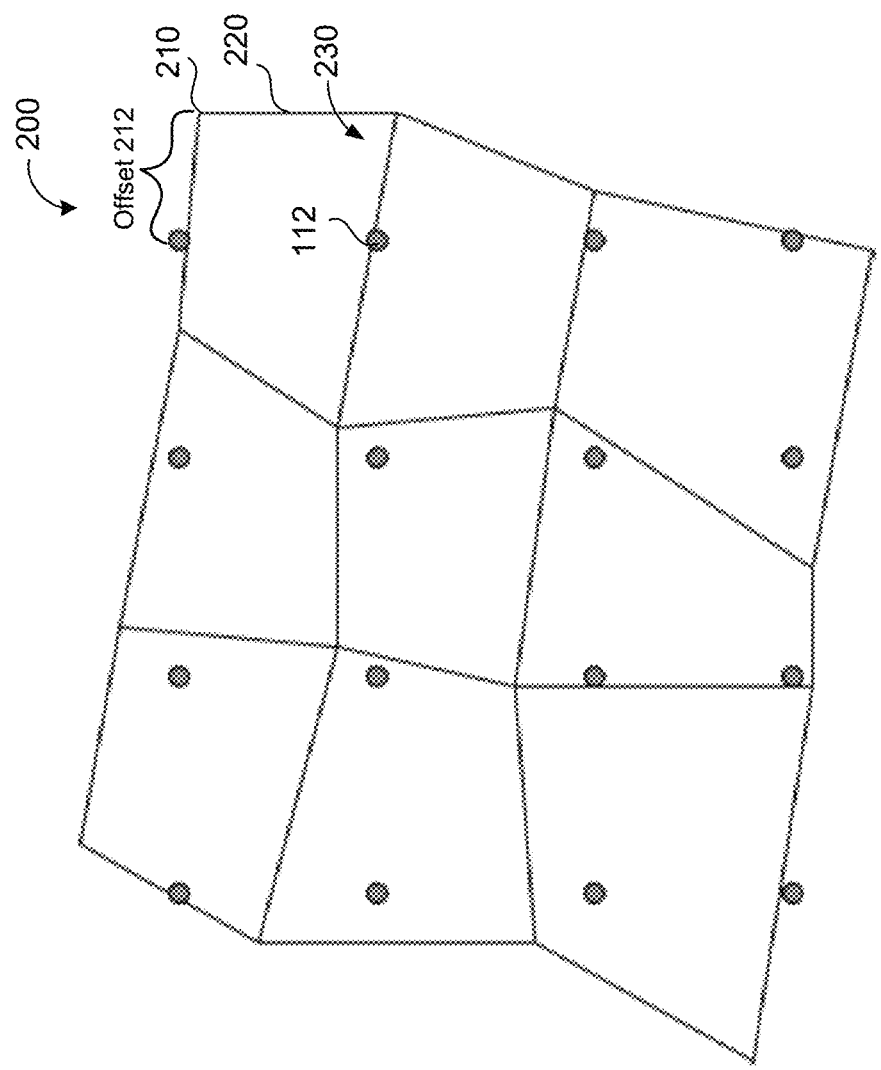
FIG. 2 is a schematic view of an example 3D polygon mesh.

Referring now to FIG. 2, the 3D polygon mesh 200 includes a plurality of vertices 210. Each vertex 210 corresponds to a single pixel 112A. However, as shown in FIG. 2, some vertices 210 may not align exactly with its associated pixel 112A and instead have an offset 212 from the pixel 112A. The vertices 210 are connected via edges 220 to form polygons 230. In some examples, the 3D mesh 200 is based on color values and the depth values 114 of the pixels 112A. Each vertex 210 may be offset in depth based on the depth value 114 such that the 3D mesh resembles a "shrink-wrap" of the scene rendered in the source frame of image data 110A.

Figure 3:
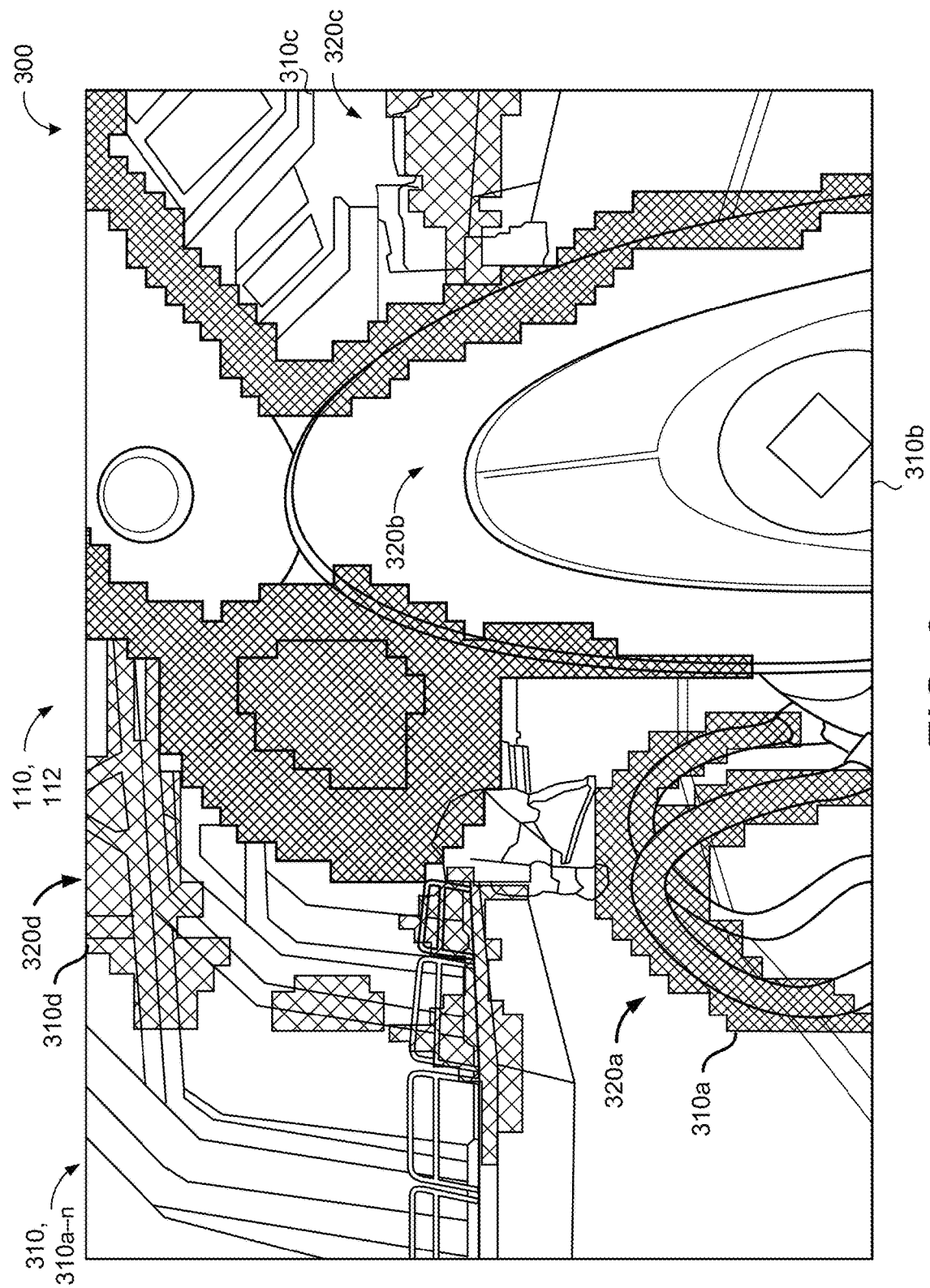
FIG. 3 is an exemplary frame of image data with an adaptive 3D polygon mesh.

Referring now to FIG. 3, in some implementations, the 3D mesh 200 is adaptive in that a density of the vertices 210 varies across the 3D mesh 200. The 3D mesh 200 may include multiple portions 310, 310a-n. Each portion 310 defines a respective mesh density 320, 320a-n formed by the respective vertices 210 within the portion 310. The mesh density 320 represents a quantity of vertices 210 within a given area of the frame of image data 110A. The adaptive mesh generator 160 may control or adjust the mesh density 320 by selecting which pixels 112 to associate with a vertex 210. For example, when the adaptive mesh generator 160 places a vertex 210 at every pixel 112A for a given portion 310, the mesh density 320 would be at a maximum for that portion 310. Conversely, when the adaptive mesh generator 160 "skips" placing a vertex 210 at several pixels 112A of the portion 310, the mesh density 320 will be comparably lower than the maximum. Accordingly, the more vertices 210 that are skipped, the relatively lower the resolution of the corresponding portion 310. Because the 3D mesh 200 is adaptive, the total number of vertices 210 may be greatly reduced (i.e., by skipping a large number of vertices 210, thereby decreasing the density of portions 310 of the 3D mesh 200), thus significantly lowering computational costs to render the frame of image data 110. However, the reprojector 150 ensures that the mesh density 320 is maintained at the most critical locations (i.e., locations that are most apparent, visible, and/or important to the user 12), quality is not substantially impacted from the perspective of the user 12.

Figure 4A:
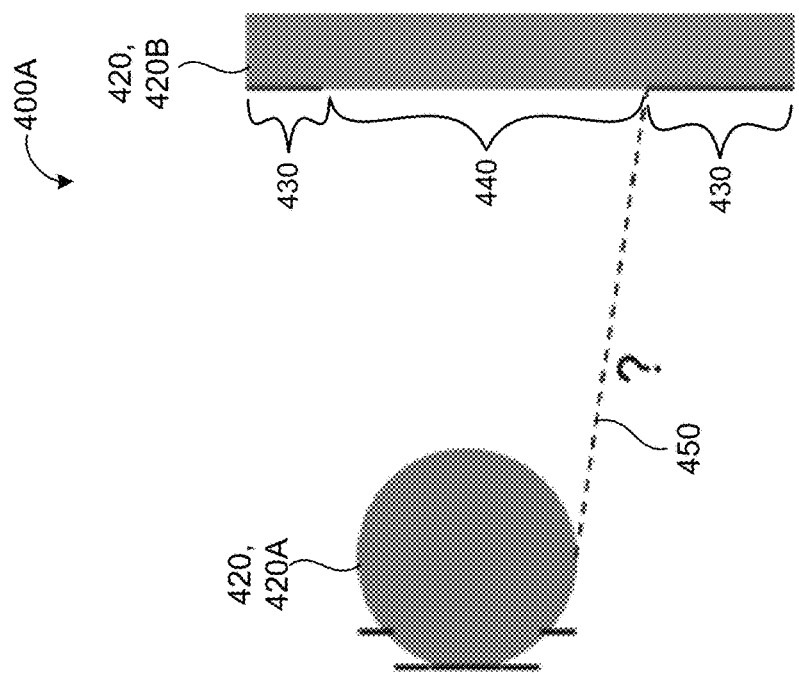
FIGS. 4A-4C are schematic views of view errors caused by differences in a source view and a destination view.
Figure 4A:
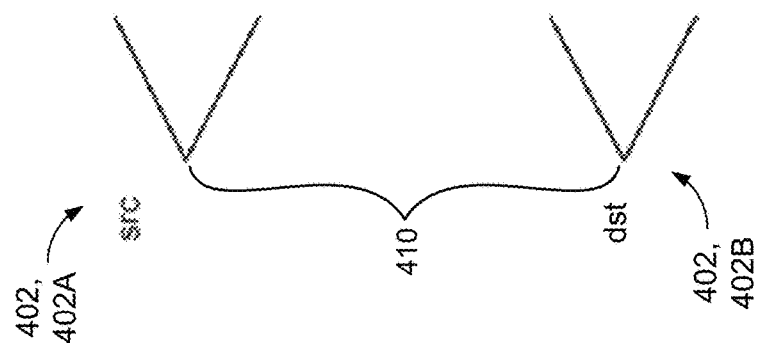

In some examples, the adaptive mesh generator 160 adjusts or controls the mesh density 320 for each portion 310 based on content of the scene of the source frame of image data 110A and/or a view error 410 (FIG. 4A). The view error 410 represents a difference between the pose or point of view of the source frame of image data 110A and the required or desired pose or point of view (i.e., the difference between the point of view that the cloud service 148 rendered and the point of view that reflects the actual current point of view of the user). For example, the adaptive mesh generator 160 adjusts the mesh density 320 based on a planarity and/or a depth of a surface rendered within each respective portion 310. Specifically, the adaptive mesh generator 160 may increase the mesh density 320 for portions 310 (i.e., surfaces within the portion 310) that are non-planar (e.g., curved) and/or near the camera position of the frame of image data 110A (i.e., portions 310 that have a large reprojection error).

As shown in FIG. 3, portions 310b, 310c have relatively lower mesh densities 320b, 320c than a portion 310d and corresponding mesh density 320d, and the portion 310d has a relatively lower mesh density 320d than a portion 310a and corresponding mesh density 320a. The portion 310c represents surfaces that are "far away" from the viewpoint of the frame of image data 110 (i.e., the pixels 112 have correspondingly large depth values 114) and are relatively planar, while the portion 310d represents surfaces that are farther away and non-planar. The portion 310b is much closer than the portion 310c, but however represents a planar surface and thus can safely maintain corresponding low density mesh density 320b. In contrast, the portion 310a includes pixels 112 that represent a surface that is both near the viewpoint (i.e., close to the "camera") and is a non-planar surface. Thus, in this example, the mesh density 320a for the portion 310a is much greater than the mesh densities 320b-d for the portions 310b-d. Put another way, a respective mesh density 320 is lower the greater/larger the depth of the surface rendered within the respective portion 310 (i.e., the farther "in the background" the surface is) and the respective mesh density 320 is lower the more planar the surface rendered within the respective portion 310. Thus, the mesh density is adaptive and effectively provides a "per-pixel" mesh density 320 where necessary (i.e., where the results are most visible to the user 12) and a much sparser density elsewhere, which allows the reprojector 150 to reproject frames of image data 110 at a fraction of the conventional computational cost.

Referring back to FIG. 1, the 6DOF reprojector 150, in some implementations, includes a scene renderer 170. The scene rendered 170 may receive the 3D mesh from the adaptive mesh generator 160. The scene rendered 170 may generate the second frame of image data 110B via reprojection using the 3D mesh 200. The second frame of image data 110B includes a second set of pixels 112, 112B that has a pose or point of view that matches a desired or required pose or point of view of the user 12 (e.g., based on manipulation of the location and/or orientation of the display 20). Thus, the 6DOF reprojector may provide the second frame of image data 110B for display at the display 20 instead of providing the source frame of image data 110A (that has view error) or waiting for the cloud service 148 to send a new frame of image data 110 (which would incur significant latency).

Figure 4B:
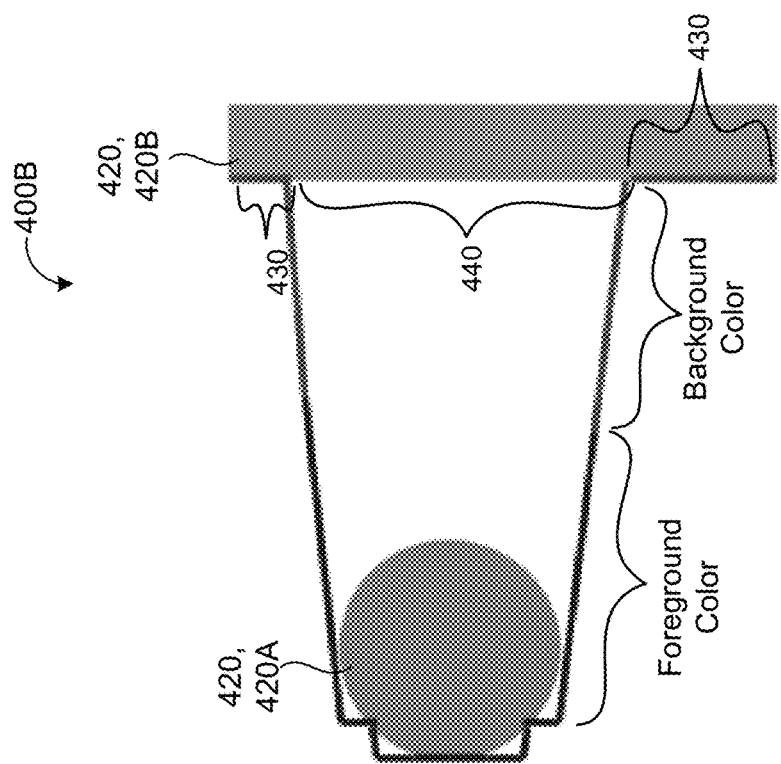
Figure 4B:
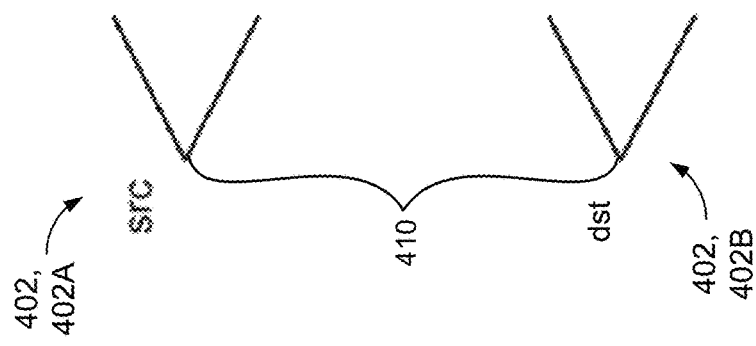
Figure 4C:
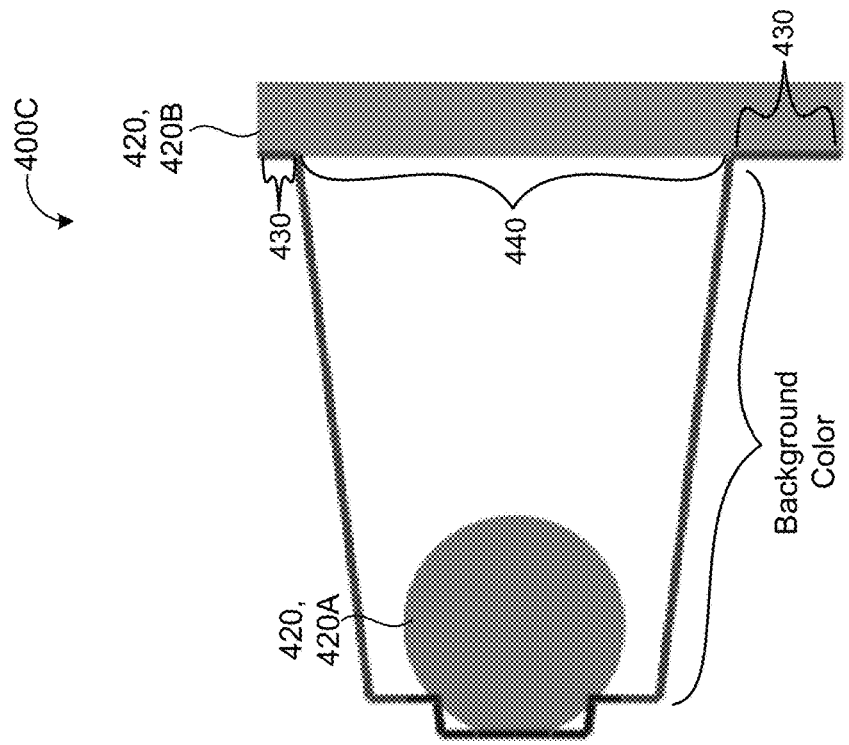
Figure 4C:
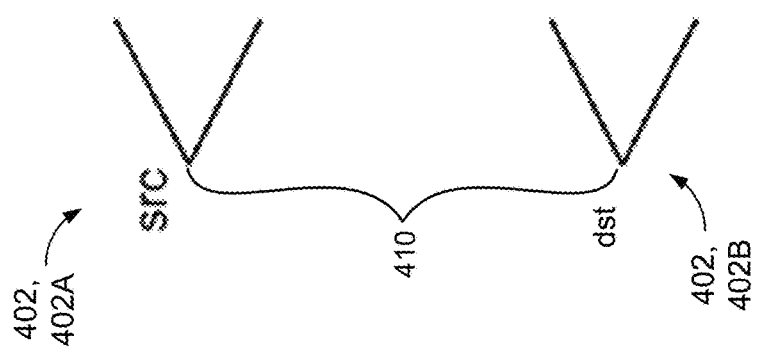

Referring now to FIGS. 4A-4C, when shifting the point of view between the first or source frame of image data 110A and the second or reprojected frame of image data 110B, surfaces that were not visible in the first frame of image data 110A may become visible in the second frame of image data 110B. In schematic view 400A (FIG. 4A), a source view 402, 402A represents the point of view or viewpoint of the source frame of image data 110A (i.e., the point of view rendered by the cloud service 148), and a destination view 402, 402B represents the point of view of the reprojected second frame of image data 110B (i.e., the point of view that corrects the view error 410 of the source frame of image data 110A). That is, the source view 402A represents the point of view predicted by the cloud service 148 while the destination view 402B represents the actual or desired point of view of the user 12.

In the given example, the scene includes a foreground object 420, 420A and a background object 420, 420B. The foreground object 420A has a depth that is closer to the source view 402A than the background object 420. Thus, only portions 430 of the background object 420B are visible while another portion 440 is obscured/occluded from the source view 402A because the foreground object 420A blocks the view. However, when reprojecting the scene from the destination view 402B, a portion of the background object 420B that was obscured from view by the foreground object 420A at the source view 402A may now be visible. Because this newly visible portion of the background object 420B was not visible in the source frame of image data 110A, the mesh 200 does not include sufficient information to draw the newly visible portion. This newly visible portion, represented by the dashed line, represents a disocclusion hole 450.

In some examples, the reprojector 150 may "fill" the disocclusion hole 450 by letting the polygons (e.g., triangles) connect to each other and "stretch" from one vertex 210 to the next from the foreground to the background. This fills the disocclusion hole 450 with "stretchy" polygons, as shown in schematic view 400B (FIG. 4B). In other words, the disocclusion hole 450 has the foreground and background colors stretch toward each other and meet half way. However, due to various factors (e.g., downsampling, anti-aliasing, etc.), the edges may actually be "jagged" that land entirely on the foreground, background, or in-between, which can cause significant artifacting in the final image.

In some implementations, the reprojector 150 determines that the second frame of image data 110B includes a portion 310 of the scene that was not visible in the source frame of image data 110A. In this scenario, the reprojector 150 may replace, for each of one or more pixels 112B in the second frame of image data 110B, a respective depth value 114 associated with the pixel 112B with a different depth value 114 that is smaller (i.e., closer to the destination view 402B) than the original respective depth value 114. The different depth value 114 may correspond to a respective depth value 114 of a different pixel 112B within a threshold distance of the one or more pixels 112B in the second frame of image data 110B. That is, the reprojector 150 may "dilate" the depth values 114 to fix artifacts caused by disocclusion holes 450. In other words, for each texel in the 3D mesh 200, the reprojector 150 may replace the texel with the closest depth texel in a neighborhood (e.g., a 3×3 neighborhood). This has the effect of "swelling" foreground objects to look slightly bigger only in the depth map, causing a one texel border around foreground objects before stretched polygons move toward the background.

As shown in schematic view 400C of FIG. 4C, after dilation, background colors are moved up to foreground depth values, which has the effect of moving the start of the stretched polygons further out from the foreground object 420A. This effectively fills the disocclusion hole 450 with background colors from the background object 420B rather than foreground colors from the foreground object 420A, which tends to improve the look of the second frame of image data 110B.

In some implementations, the reprojector 150 determines that the second frame of image data 110B includes a portion of the scene that was not visible in the first frame of image data 110A (FIG. 4A). The reprojector, in these implementations, determines whether the portion of the scene that was not visible in the first frame of image data 110A is visible in a historical frame of image data 110 (i.e., any frame of image data 110 previously rendered). When the portion of the scene is visible in the historical frame of image data 110, the reprojector 150 adjusts the second frame of image data 110B with information from the historical frame of image data 110. That is, to improve filling disocclusion holes 450, the reprojector 150 may leverage additional views provided by historical frames of image data to "paint in" the disocclusion holes 450. The historical frames of image data 110 represent frames of image data 110 previously rendered by the cloud service 148 that have a point of view different than the source view 402A. For example, the reprojector 150 occasionally stores some or all of a frame of image data 110 received from the cloud service 148. One or more of these historical frames of image data may include any newly visible portions 440 exposed by the view error 410. These views may be used to fill in the disocclusion holes 450 generated by the view error 410.

The reprojector 150 may only store historical frames of image data 110 that are sufficiently different (i.e., have a sufficiently different point of view) from other previously stored frames of image data 110. The reprojector 150 may store a limited quantity or cache of historical frames of image data 110 in a first in, first out (FIFO) manner. The reprojector 150 may determine whether any of the historical frames of image data 110 provide a point of view that is helpful in filling disocclusion holes 450 of the current frame of image data 110B.

Thus, the 6DOF reprojector 150 provides reprojection of rendered frames of image data 110 efficiently, allowing lower-end hardware (e.g., mobile phones) to render new scenes in a few milliseconds. The reprojector 150 may use an adaptive 3D mesh 200 to reduce the number of vertices 210. Optionally, the reprojector 150 uses depth dilation to improve hole filling quality by dilating depth values 114 to expand a size of foreground objects while leaving color values unchanged. In some examples, the reprojector 150 uses an efficient multi-view disocclusion hole filling scheme based on historical frames of image data 110 and/or opportunistically rendered additional frames to fill in disocclusion holes 450. The reprojector 150 may reproject frames of image data 110 whenever a frame of image data 110 must be quickly rendered (e.g., for streaming services such as virtual reality streaming services, to temporally increase frame rate, etc.). That is, the reprojector 150 may be used in any application where a frame of image data must be displayed before a fully rendered frame of image data will be available (i.e., from local or remote hardware).

Figure 5:
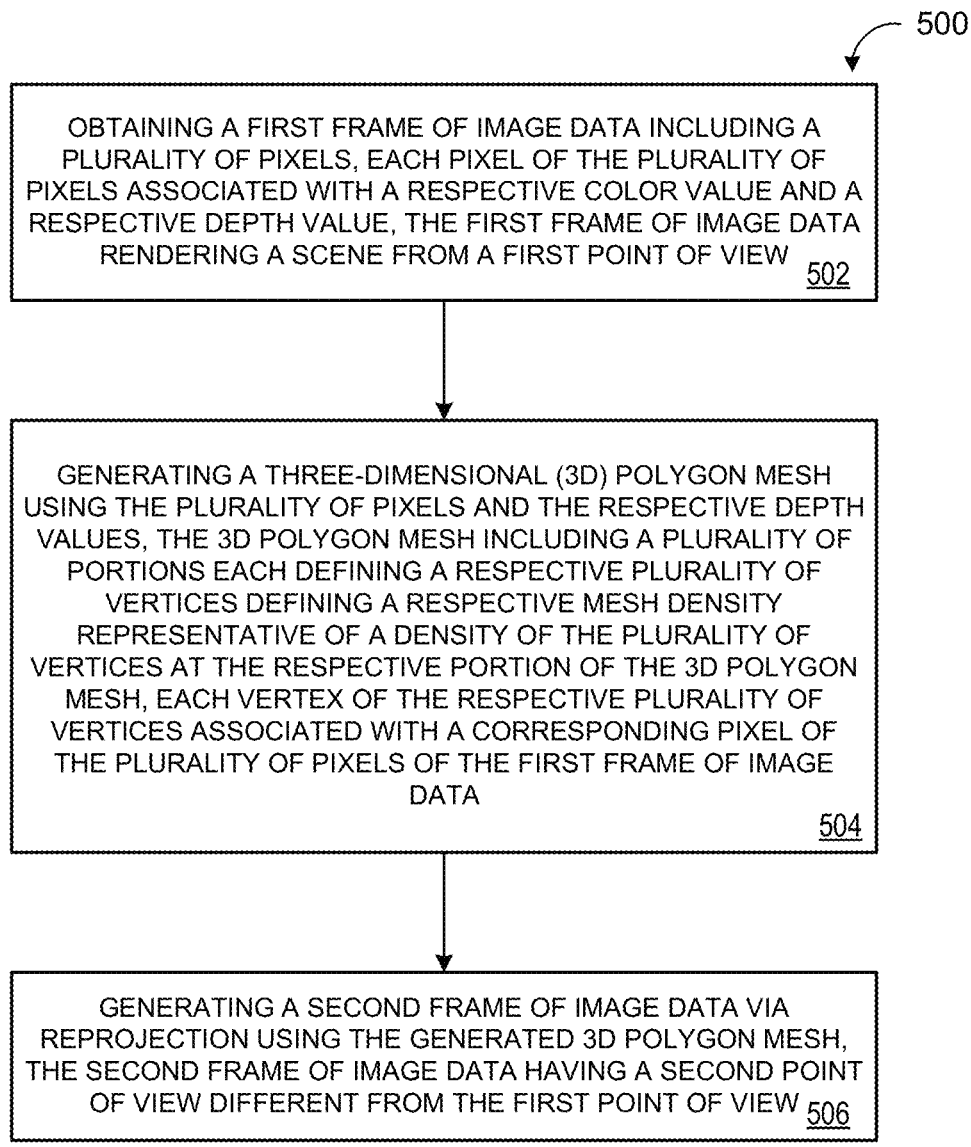
FIG. 5 is a flowchart of an example arrangement of operations for a method of using adaptive mesh reprojection for low latency 6DOF rendering.

FIG. 5 is a flowchart of an exemplary arrangement of operations for a method 500 of performing adaptive mesh reprojection for low latency 6DOF rendering. The method 500, at operation 502, includes obtaining a first frame of image data 110A that includes a plurality of pixels 112A. Each pixel of the plurality of pixels 112A is associated with a respective color value and a respective depth value 114. The first frame of image data 110A renders a scene from a first point of view 402A. At operation 504, the method 500 includes generating a 3D polygon mesh 200 using the plurality of pixels 112A and the respective depth values 114. The 3D polygon mesh 200 includes a plurality of portions 310 each defining a respective plurality of vertices 210 defining a respective mesh density 320 representative of a density of the plurality of vertices 210 at the respective portion 310 of the 3D polygon mesh 200. Each vertex 210 of the respective plurality of vertices 210 associated with a corresponding pixel 112A of the plurality of pixels 112A of the first frame of image data 110A. The method 500, at operation 506, includes generating a second frame of image data 110B via reprojection using the generated 3D polygon mesh 200. The second frame of image data 110B has a second point of view 402B different from the first point of view 402A.

Figure 6:
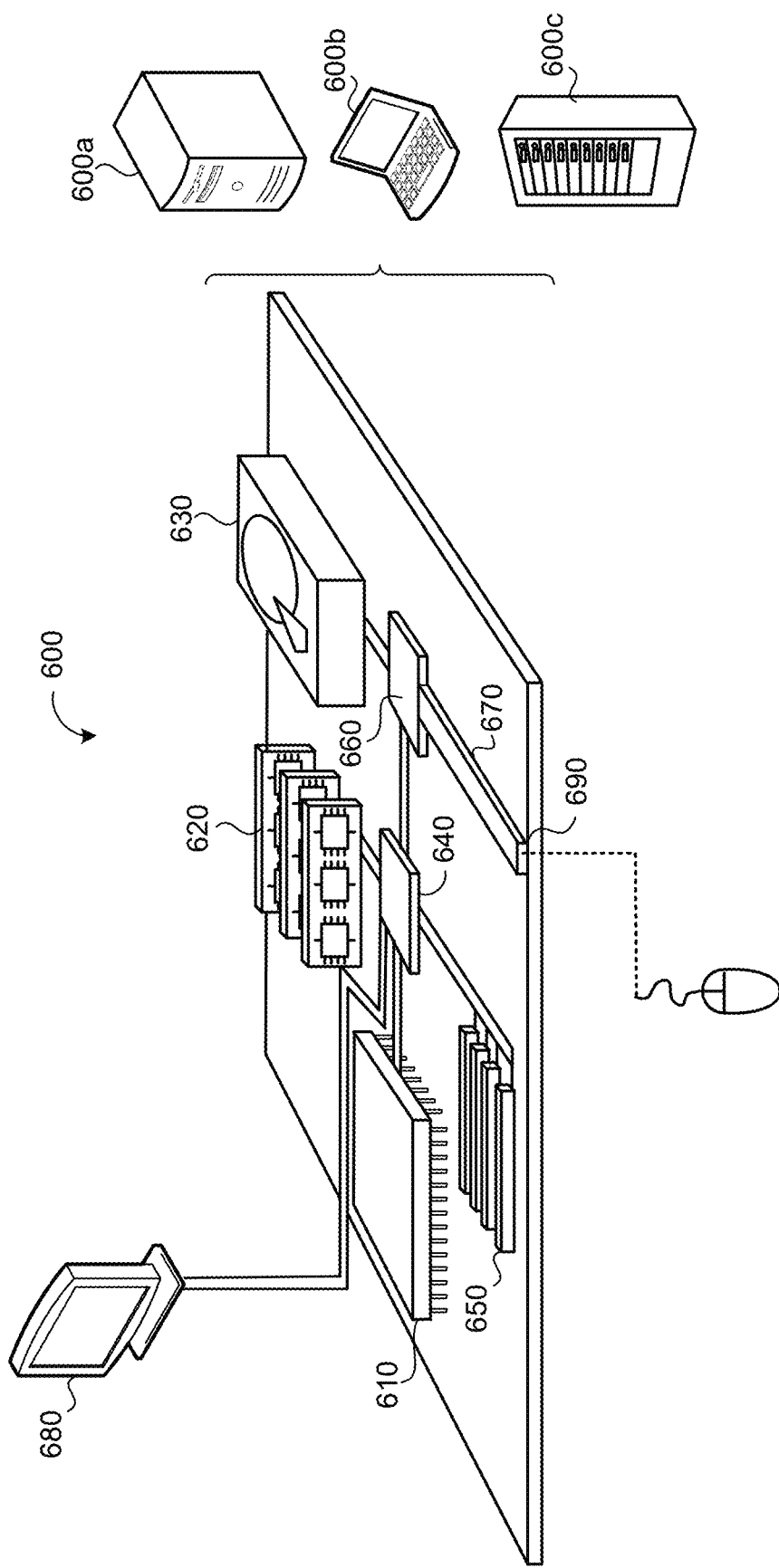
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
predicting, by a computing system, a first point of view for a future rendering of a scene;
obtaining, by the computing system, a first frame of image data comprising a first plurality of pixels, each pixel of the first plurality of pixels associated with a respective color value and a respective depth value, the first frame of image data rendering the scene from a second point of view;
determining, by the computing system, a view error representative of differences between the first point of view and the second point of view;
selecting, by the computing system, and based on the view error, a subset of pixels of the first plurality of pixels;
generating, by the computing system, and using the subset of pixels of the first plurality of pixels, a three-dimensional (3D) polygon mesh, wherein the 3D polygon mesh includes a plurality of portions, wherein each portion of the plurality of portions is associated with a respective density of a respective plurality of vertices, wherein each vertex of the respective plurality of vertices is associated with a corresponding pixel of the subset of pixels of the first plurality of pixels, and wherein each vertex of the respective plurality of vertices has a depth in the 3D polygon mesh based on the respective depth value of the corresponding pixel;
generating, by the computing system, a second frame of image data via reprojection using the 3D polygon mesh, the second frame of image data comprising a second plurality of pixels, each pixel of the second plurality of pixels associated with a respective depth value, the second frame of image data having a third point of view different from the second point of view;

determining, by the computing system, that the second frame of image data includes a subset of pixels of the second plurality of pixels that correspond to a portion of the scene that was not visible in the first frame of image data; and replacing, by the computing system, the respective depth value of each pixel of the subset of pixels of the second plurality of pixels with a different depth value that is smaller than the respective depth value.

2. The method of claim 1, wherein generating the 3D polygon mesh further comprises, for each portion of the plurality of portions, offsetting, by the computing system, each vertex of the respective plurality of vertices based on the respective depth value of the corresponding pixel.

3. The method of claim 1, wherein each respective density is based on content of the scene and the view error representative of differences between the first point of view and the second point of view.

4. The method of claim 3, wherein each respective density is based on a planarity and a depth of a surface rendered within the associated portion.

5. The method of claim 4, wherein the respective density when the surface rendered within the associated portion is planar is less than the respective density when the surface rendered within the associated portion is nonplanar.

6. The method of claim 4, wherein the respective density is greater the smaller the depth of the surface rendered within the associated portion.

7. The method of claim 1, wherein the different depth value corresponds to the respective depth value of a different pixel within a threshold distance of the subset of pixels of the second plurality of pixels included in the second frame of image data.

8. The method of claim 1, wherein the method further comprises:
  determining, by the computing system, that the second frame of image data includes a portion of the scene that was not visible in the first frame of image data;
  determining, by the computing system, whether the portion of the scene that was not visible in the first frame of image data is visible in a historical frame of image data; and
  when the portion of the scene is visible in the historical frame of image data, adjusting, by the computing system, the second frame of image data with information from the historical frame of image data.

9. A system comprising:
data processing hardware; and
memory hardware in communication with the data processing hardware, the memory hardware storing instructions that, when executed on the data processing hardware, cause the data processing hardware to:
  predict a first point of view for a future rendering of a scene;
  obtain a first frame of image data comprising a first plurality of pixels, each pixel of the plurality of pixels associated with a respective color value and a respective depth value, the first frame of image data rendering the scene from a second point of view;
  determine a view error representative of differences between the first point of view and the second point of view;
  select, based on the view error, a subset of pixels of the first plurality of pixels;
  generate, using the subset of pixels of the first plurality of pixels, a three-dimensional (3D) polygon mesh, wherein the 3D polygon mesh includes a plurality of portions, wherein each portion of the plurality of portions is associated with a respective density of a respective plurality of vertices, wherein each vertex of the respective plurality of vertices is associated with a corresponding pixel of the subset of pixels of the first plurality of pixels, and wherein each vertex of the respective plurality of vertices has a depth in the 3D polygon mesh based on the respective depth value of the corresponding pixel;
  generate a second frame of image data via reprojection using the 3D polygon mesh, the second frame of image data comprising a second plurality of pixels, each pixel of the second plurality of pixels associated with a respective depth value, the second frame of image data having a third point of view different from the second point of view;
  determine that the second frame of image data includes a subset of pixels of the second plurality of pixels that correspond to a portion of the scene that was not visible in the first frame of image data; and
  replace the respective depth value of each pixel of the subset of pixels of the second plurality of pixels with a different depth value that is smaller than the respective depth value.

10. The system of claim 9, wherein to generate the 3D polygon mesh, the instructions further cause the data processing hardware to, for each portion of the plurality of portions, offset each vertex of the respective plurality of vertices based on the respective depth value of the corresponding pixel.

11. The system of claim 9, wherein each respective density is based on content of the scene and the view error representative of differences between the first point of view and the second point of view.

12. The system of claim 11, wherein each respective density is based on a planarity and a depth of a surface rendered within the associated portion.

13. The system of claim 12, wherein the respective density when the surface rendered within the associated portion is planar is less than the respective density when the surface rendered within the associated portion is nonplanar.

14. The system of claim 12, wherein the respective density is greater the smaller the depth of the surface rendered within the associated portion.

15. The system of claim 9, wherein the different depth value corresponds to the respective depth value of a different pixel within a threshold distance of the subset of pixels of the second plurality of pixels included in the second frame of image data.

16. The system of claim 9, wherein the instructions further cause the data processing hardware to:
  determine that the second frame of image data includes a portion of the scene that was not visible in the first frame of image data;
  determine whether the portion of the scene that was not visible in the first frame of image data is visible in a historical frame of image data; and
  when the portion of the scene is visible in the historical frame of image data, adjust the second frame of image data with information from the historical frame of image data.

* * * * *